United States Patent
Barley et al.

(10) Patent No.: US 8,095,558 B2
(45) Date of Patent: Jan. 10, 2012

(54) SYSTEM FOR LOGGING AND REPORTING ACCESS TO CONTENT USING UNIQUE CONTENT IDENTIFIERS

(75) Inventors: David M. Barley, Torrance, CA (US); Ryuji J. Masuda, Santa Rosa Valley, CA (US); Richard Daley, Loveland, CO (US)

(73) Assignee: Casdex, Inc., Camarillo, CA (US)

( * ) Notice: Subject to any disclaimer, the term of this patent is extended or adjusted under 35 U.S.C. 154(b) by 604 days.

(21) Appl. No.: 12/330,496

(22) Filed: Dec. 8, 2008

(65) Prior Publication Data

US 2009/0157740 A1 Jun. 18, 2009

Related U.S. Application Data

(60) Provisional application No. 61/007,633, filed on Dec. 14, 2007.

(51) Int. Cl.
*G06F 17/30* (2006.01)

(52) U.S. Cl. ........................................ 707/791; 711/108

(58) Field of Classification Search .................. 707/791; 711/108

See application file for complete search history.

(56) References Cited

U.S. PATENT DOCUMENTS

| | | | |
|---|---|---|---|
| 7,805,470 B2 * | 9/2010 | Armangau et al. | 707/822 |
| 2004/0133544 A1 | 7/2004 | Kiessig et al. | |
| 2007/0038857 A1 | 2/2007 | Gosnell | |
| 2007/0276789 A1 | 11/2007 | Keithley et al. | |

* cited by examiner

*Primary Examiner* — Cheryl Lewis

(57) ABSTRACT

One embodiment of a system for logging and reporting access to content includes a content addressable storage manager configured to control storing of data elements to the content storage and retrieving of data elements from the content storage, the content addressable storage manager including a content identifier generator configured to generate a content identifier for each data element stored in the content storage, and an access log module configured to record access data for each data element stored in the content storage and to associate the access data for each data element with a content identifier of that data element. The access log module is also configured to generate an access report that includes access data for one or more data elements stored in the content storage.

18 Claims, 4 Drawing Sheets

Access Report For: Document_A.txt
Content Identifier: 84le024567icd840cisu763946

| Storage Location | Client Identifier | Action | Date & Time | File name |
|---|---|---|---|---|
| a\b\12 | Client_a | Storage | ------- | Document_X.txt |
| a\b\12 | Client_a | Retrieval | ------- | Document_X.txt |
| a\b\12 | Client_a | Filename Change | ------- | Document_A.txt |
| a\b\12 | Client_b | Retrieval | ------- | Document_A.txt |
| a\b\47 | Client_c | Location Change | ------- | Document_A.txt |
| a\b\47 | Client_f | Invalid Access Attempt | | Document_A.txt |

SYSTEM FOR LOGGING AND REPORTING ACCESS TO CONTENT USING UNIQUE CONTENT IDENTIFIERS

CROSS-REFERENCE TO RELATED APPLICATION

This application claims the benefit of U.S. Provisional Patent Application No. 61/007,633, entitled "Logging and Reporting Content Accessed by Unique File Identifier," filed on Dec. 14, 2007. The subject matter of the related application is hereby incorporated by reference.

FIELD OF THE INVENTION

This invention relates generally to logging and reporting access to stored content and relates more particularly to a system for logging and reporting access to content using unique content identifiers.

BACKGROUND

User access to data that is centrally stored and accessible to multiple users is often monitored. Systems for monitoring data accessible to multiple users typically track who has accessed what content and when the content was accessed. The systems generally identify and log the user accessing a file, the address of the client computer accessing the file, the date and time of the access, and the filename and directory path of the file.

Such systems typically track access according to the filename given to a file. But since filenames and directory paths can be changed, tracking access by filename and location may not always provide accurate information as to what content has been accessed by whom.

SUMMARY

One embodiment of a system for logging and reporting access to content includes a content addressable storage manager configured to control storing of data elements to the content storage and retrieving of data elements from the content storage, the content addressable storage manager including a content identifier generator configured to generate a content identifier for each data element stored in the content storage, and an access log module configured to record access data for each data element stored in the content storage and to associate the access data for each data element with a content identifier of that data element. The access log module is also configured to generate an access report that includes access data for one or more data elements stored in the content storage.

One embodiment of a system for logging and reporting access to content includes a content addressable storage application configured to send data elements to a content addressable storage system for storage and to request retrieval of data elements from the content addressable storage system; and an access log module configured to record access data for each data element stored in the content addressable storage system and to associate the access data for each data element with a content identifier of that data element. The access log module is also configured to generate an access report that includes access data for one or more data elements stored in the content addressable storage system.

BRIEF DESCRIPTION OF THE DRAWINGS

FIG. 4 is diagram of one embodiment of a report generated by the access log module of FIG. 1, according to the invention.

DETAILED DESCRIPTION

Content addressable storage (CAS) is a technique for storing a segment of electronic information that can be retrieved based on its content, not on its storage location. When information is stored in a CAS system, a content identifier is created and linked to the information. The content identifier is then used to retrieve the information. The content identifier is stored with an identifier of where the information is stored. When information is to be stored, a hashing algorithm is used to create the content identifier that is ideally unique to the information. The content identifier is then compared to a list of content identifiers for information already stored on the system. If the content identifier is found on the list, the information is not stored a second time. Thus a typical CAS system does not store duplicates of information, providing efficient storage. If the content identifier is not already on the list, the information is stored, and the content identifier is stored in the table with the location of the information.

Content addressable storage is most commonly used to store information that does not change, such as archived emails, financial records, medical records, and publications. Content addressable storage is highly suited to storing information required by compliance programs because the content can be verified as not having changed. Content addressable storage is also highly suited for storing documents that may need to be produced in litigation discovery. A document that can be produced with a content identifier that was created using a reliable hashing algorithm can establish the authenticity of the document. When information is retrieved from a CAS system, a content identifier is provided, and the location corresponding to that content identifier is looked up and the information is retrieved. The content identifier is then recalculated based on the content of the retrieved information and the newly-calculated content identifier is compared to the provided content identifier to verify that the content has not changed.

Figure 1:
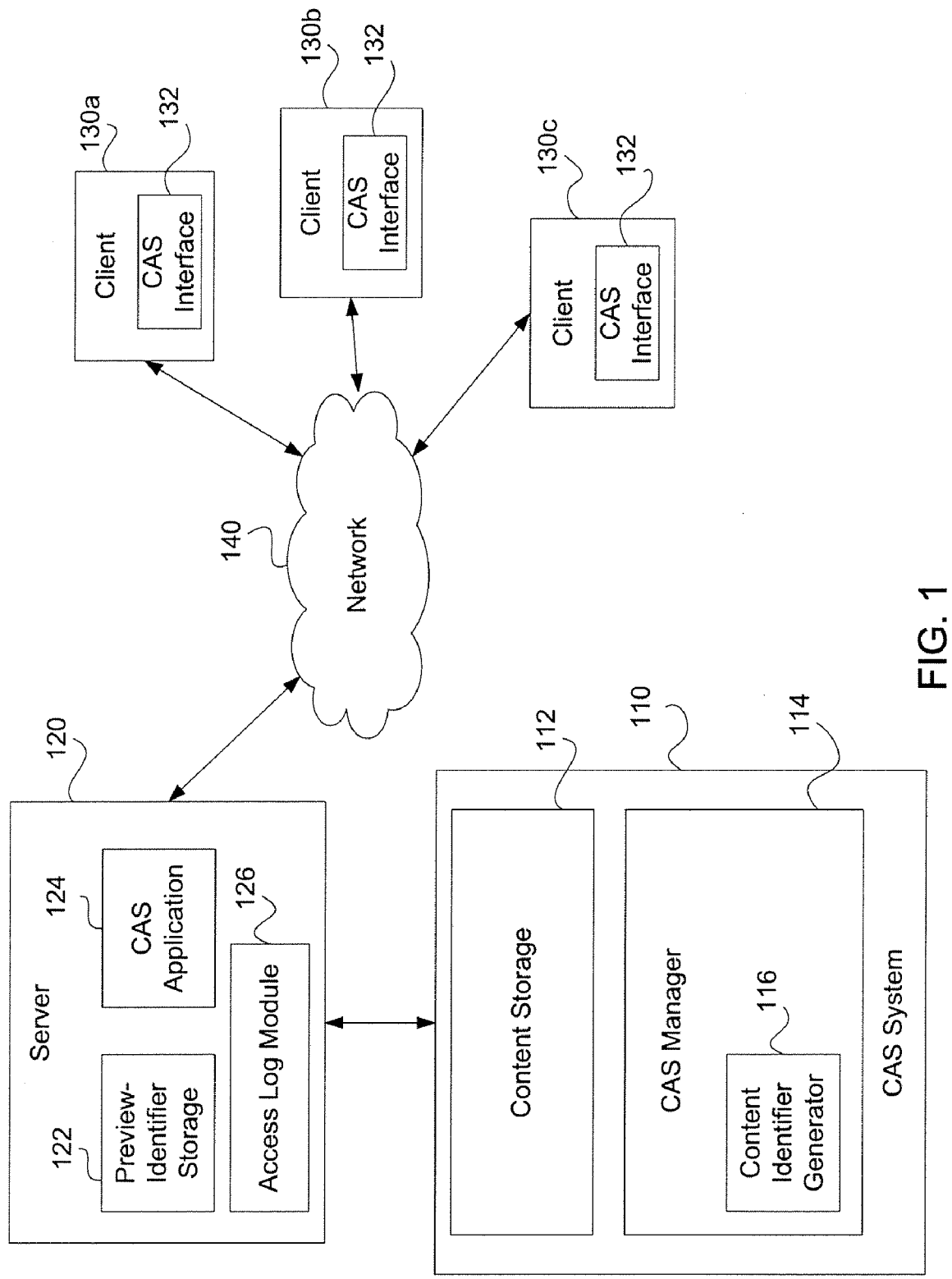
FIG. 1 is a block diagram of one embodiment of a system including a content addressable storage system, in accordance with the invention.

FIG. 1 is a block diagram of one embodiment of a system including, but not limited to, a content addressable storage (CAS) system 110, a server 120, a network 140, and a plurality of clients 130. CAS system 110 includes content storage 112 and a CAS manager 114. Content storage 112 may store data elements of any type, including documents, images, video files, audio files, and emails. Large files may be divided into more than one data element that are stored separately. Content storage 112 is preferably embodied as an array of magnetic disks, but can also be embodied as optical disks, tape, or a combination of magnetic disks, optical disks, and tapes. CAS manager 114 controls the writing of data elements to content storage 112 and controls the reading of data elements from content storage 112. Before writing a data element to content storage 112, CAS manager 114 creates a content identifier for that data element using content identifier generator 116. Content identifier generator 116 applies a hash algorithm to the content of the data element to generate a unique content identifier for the data element. Content identifier generator 116 also applies the hash algorithm to metadata associated with the data element to generate a metadata identifier. In one embodiment, the hash algorithm is the well-known MD5 hash algorithm that produces a 128-bit number derived from the content of a data element; however any other hash algorithm, such as SHA-1, may be used to generate content identifiers so long as the probability of generating identical content identifiers for different data elements using that algorithm is below an acceptable threshold.

Clients 130a-c communicate with server 120 via network 140 to store and retrieve content from CAS system 110. Clients 130a-c may be any general computing device such as a personal computer, a workstation, a laptop computer, or a handheld computer. Each of clients 130a-c includes a CAS interface 132 that is configured to enable a user of client 130 to store content in CAS system 110 and to retrieve content from CAS system 110. CAS interface 132 includes a graphical user interface (GUI) that provides information to a user and enables the user to provide inputs to CAS interface 132. Network 140 may be any type of communication network such as a local area network or a wide area network, and may be wired, wireless, or a combination.

Server 120 includes a CAS application 124 that is configured to communicate with clients 130a-c and CAS system 110. In one embodiment, CAS application 124 is configured to communicate with clients 130a-c using a standard communication protocol such as a TCP/IP protocol, and is configured to communicate with CAS system 110 using a storage network protocol such as Fibre Channel. Server 120 also includes a preview-identifier storage 122 that stores previews of data elements stored in CAS system 110, content identifiers and metadata identifiers associated with the previews, and storage location identifiers associated with the previews. In one embodiment, a preview is a "thumbnail" image of a data element; however other types of previews are within the scope of the invention.

Server 120 further includes an access log module 126 that is configured to record access data for data elements stored in CAS system 110. The access data is related to actions taken with respect to data elements, including but are not limited to requests to save data elements in CAS system 110, requests to save new versions of data elements stored in CAS system 110, deletions of data elements stored in CAS system 110, and retrievals of data elements stored in CAS system 110. Access log module 126 records access data for such actions for each data element stored in CAS system 110, and associates the access data with the content identifier of the data element. Access log module 126 also records access data regarding other actions such as unsuccessful (i.e., unauthorized) attempts to retrieve a data element and changes in filename or storage location.

The access data recorded by access log module 126 includes the type of action, the date and time of the action, and an identifier of the user and/or client 130 that initiated the action. The access data may also include information identical to the metadata of the data element, such as filename, directory or file path, file size, author, and creation date. In one embodiment, the access data is stored in an access log located in a memory (not shown) of server 120. Access log module 126 associates the access data it records for a data element with the content identifier of the data element. By associating the access data with the unique content identifier, access log module 126 is able to monitor access to the data element even if other identifying information, such as the filename or storage location, is changed.

Access log module 126 is also configured to generate a report that includes the access data for one or more data elements. A user at server 120 can request a report from access log module 126, and access log module 126 generates a report that includes specific access data for the data elements identified by the user in the request. The report lists the content identifier and storage location for each data element subject to the request, and also includes specific access data for each data element subject to the request. The access data in the report may be only a portion of the total access data for a data element that is stored by access log module 126. For example, the access data in the report may include only the date, time, and user identifier for each instance of retrieval of the data elements. In another embodiment, a user at one of clients 130a-c can request a report from access log module 126. Access log module 126 is also configured to generate other types of reports that include information from the access log. For example, access log module 126 may generate a report that identifies all of the data elements accessed by a particular user or client 130. This type of report also identifies data elements by their unique content identifiers.

Figure 2:
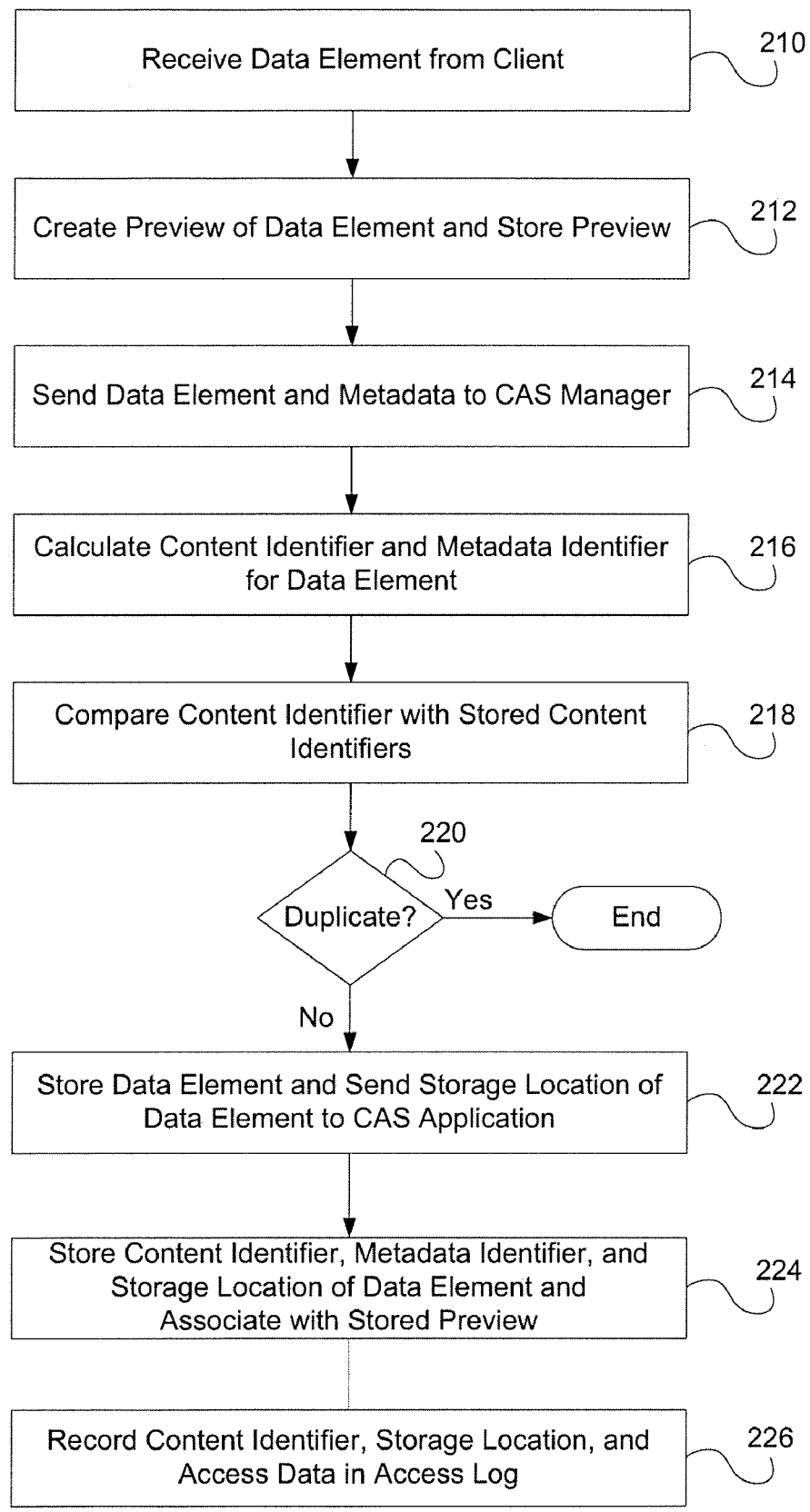
FIG. 2 is a flowchart of method steps for storing a data element into the content addressable storage system of FIG. 1, according to one embodiment of the invention.

FIG. 2 is a flowchart of method steps for storing a data element into the content addressable storage system of FIG. 1, according to one embodiment of the invention. In step 210, CAS application 124 receives a data element from client 130b. A user of client 130b selects a data element and indicates via CAS interface 132 that the data element is to be stored in CAS system 112. In step 212, CAS application 124 creates a preview of the data element and stores the preview in preview-identifier storage 122. In step 214, CAS application 124 sends the data element and metadata associated with the data element to CAS manager 114. The metadata may include a filename, file path, file size, author, and/or date. In step 216, content identifier generator 116 calculates a content identifier for the data element using a hash algorithm and calculates a metadata identifier for the metadata associated with the data element. In step 218, CAS manager 114 sends the content identifier of the data element and the metadata identifier to CAS application 124, which compares the content identifier with the content identifiers stored in preview-identifier storage 122 to determine if a duplicate of the data element has been previously stored in CAS system 110. In step 220, if the content identifier is not a duplicate, the method continues with step 222, in which CAS manager 114 writes the data element to content storage 112 and sends the storage location identifier to CAS application 124. Then in step 224, CAS application 124 stores the content identifier, metadata identifier, and storage location identifier of the data element in preview-identifier storage 112 and associates the content identifier, metadata identifier and storage location identifier with the preview of the data element in preview-identifier storage 112. In one embodiment, preview-identifier storage 112 includes a table that reflects the relationships between a preview of a data element, the content identifier and metadata identifier of that data element, and the storage location of that data element in content storage 112.

In step 226, access log module 126 records the content identifier, the storage location, and access data in an access log. In the FIG. 2 embodiment, the access data includes but is not limited to an identifier of client 130b, an indication that the action regarding the data element was a request to store a new data element to CAS system 110, and the date and time that the data element was stored. Returning to step 220, if the content identifier is a duplicate, the method ends because the data element has been previously stored in content storage 112.

The data element to be stored may be a revised version of a data element that has been stored in CAS system 110. For each data element to be stored, CAS application 124 queries preview-identifier storage 122 to determine if a data element with the same filename as the current data element has been previously stored in CAS system 110. If there is only one other data element with that filename stored, CAS application 124 creates an archive that includes the previews, content identifiers, and metadata identifiers of both data elements and will store the previews, content identifiers, and metadata identifiers of all future versions (each a separate data element) for that filename in the archive. If an archive having that filename already exists, CAS application 124 will add the preview, content identifier, and metadata identifier of the data element to the archive. Access log module 126 will then record the content identifier, storage location, and access data in the access log.

Figure 3:
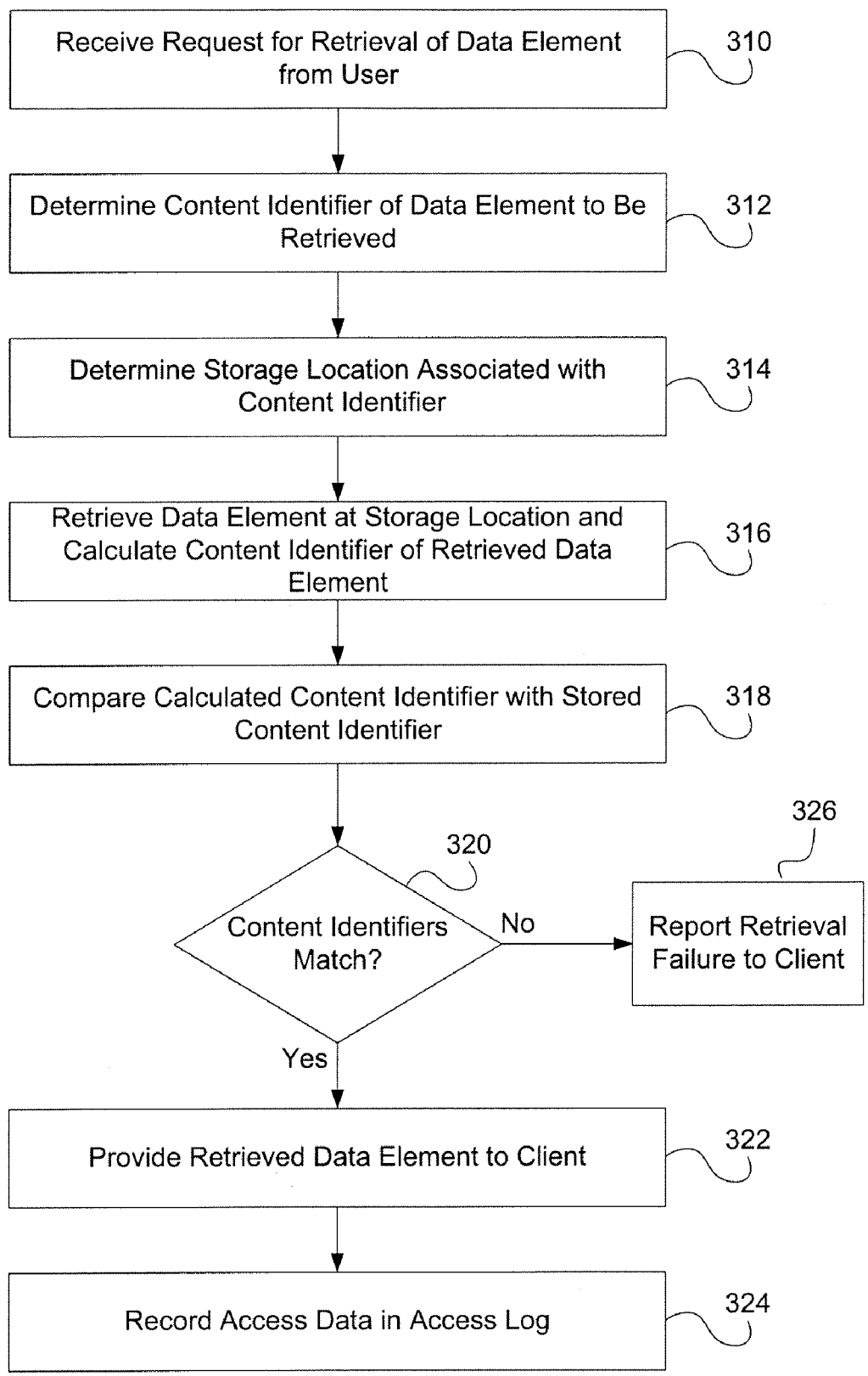
FIG. 3 is a flowchart of method steps for retrieving a data element from the content addressable storage system of FIG. 1, according to one embodiment of the invention.

FIG. 3 is a flowchart of method steps for retrieving a data element from the content addressable storage system of FIG. 1, according to one embodiment of the invention. In step 310, CAS application 124 receives a request for retrieval of a preview of a data element from a user via CAS interface 132. In one embodiment, CAS application 124 provides a listing of data elements stored in content storage 112 to CAS interface 132, where the listing identifies the data elements by filename or other metadata. A user then provides input to CAS interface 132 to identify the data element to be retrieved, such as by clicking on a filename displayed by a GUI, and CAS interface 132 sends the selected filename to CAS application 124. In step 312, CAS application 124 determines the content identifier of the data element to be retrieved. In one embodiment, CAS application 124 queries preview-identifier storage 122 for the content identifier that is associated with the filename or other metadata provided by CAS interface 132. In step 314, CAS application 124 determines the storage location associated with the content identifier and provides the storage location to CAS manager 114. In step 316, CAS manager 114 retrieves the data element at the storage location provided by CAS application 124 from content storage 112, calculates the content identifier for the retrieved data element using content identifier generator 116, and sends the retrieved data element and the newly-calculated content identifier to CAS application 124. In step 318, CAS application 124 compares the newly-calculated content identifier with the content identifier stored in preview-identifier storage 122.

In step 320, if the content identifiers match, the method continues with step 322, in which CAS application 124 provides the retrieved data element to CAS interface 132 at the requesting client 130. In step 324, access log module 126 records access data for the retrieved data element in the access log. In the FIG. 3 embodiment, the access data includes but is not limited to an identifier of the requesting client 130, an indication that the action regarding the data element was a request to retrieve the data element, and the date and time that the data element was retrieved. Access log module 126 associates the newly-recorded access data with the content identifier and storage location of the data element.

Returning to step 320, if the content identifiers do not match, the method continues with step 326, in which CAS application 124 reports the failure to retrieve the requested data element to CAS interface 132 of the requesting client 130.

FIG. 4 is a diagram of one embodiment of a report 412 generated by access log module 126, according to the invention. Report 412 shows the access records for a particular data element stored in CAS system 110. The access data shown in report 412 includes actions taken with regard to the data element, as well as identifications of the storage location, the client device that initiated the action, the date and time of the action, and the filename. Report 412 also shows a representation of the content identifier of the data element. In the FIG. 4 embodiment, the representation of the content identifier is a 26-character alphanumeric string derived from the content identifier. Other representations of the content identifier are within the scope of the invention.

Access log module 126 generates a report for a data element by identifying all the recorded actions related to that data element's unique content identifier. Since access log module 126 associates the recorded access data to the data element's content identifier, all actions regarding that data element are reflected in the report even if the data element's other identifying characteristics, such as filename and storage location, have been changed.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system comprising:
a content storage;
a content addressable storage manager configured to control storing of data elements to the content storage and retrieving of data elements from the content storage, the content addressable storage manager including a content identifier generator configured to generate a content identifier for each data element stored in the content storage; and
an access log module configured to record access data for each data element stored in the content storage and to associate the access data for each data element with a content identifier of that data element.

2. The system of claim 1, wherein the content identifier generator is configured to generate the content identifier by applying a hash algorithm to content of the data element.

3. The system of claim 1, wherein the access log module is configured to store the access data in an access log.

4. The system of claim 1, wherein the access log module is further configured to generate an access report that includes access data for one or more data elements stored in the content storage.

5. The system of claim 1, wherein the access data for a data element includes an identifier of an action taken with regard to the data element.

6. The system of claim 5, wherein the action taken with regard to the data element is a retrieval of the data element from the content storage.

7. The system of claim 5, wherein the action taken with regard to the data element is changing a storage location of the data element within the content storage.

8. The system of claim 5, wherein the action taken with regard to the data element is the storage of the data element in the content storage.

9. The system of claim 5, wherein the action taken with regard to the data element is changing a filename of the data element.

10. A system comprising:
a content addressable storage manager configured to control storing of data elements to a content storage and retrieving of data elements from the content storage, the content addressable storage manager including a content identifier generator configured to generate a content identifier for each data element stored in the content storage, wherein the content identifier is derived from the content of the data element;

a content addressable storage application configured to communicate with the content addressable storage manager and a content addressable interface of a client, and configured to enable a user at the client to store data elements in the content storage and retrieve data elements from the content storage; and an access log module configured to record access data for each data element stored in the content storage and to associate the access data for each data element with a content identifier of that data element.

11. The system of claim 10, wherein the content identifier generator is configured to generate the content identifier by applying a hash algorithm to content of the data element.

12. The system of claim 10, wherein the access data for a data element includes an identifier of an action taken with regard to the data element.

13. The system of claim 10, wherein the access log module is further configured to generate an access report that includes access data for one or more data elements stored in the content storage.

14. A system comprising:

a content addressable storage application configured to send data elements to a content addressable storage system for storage and to request retrieval of data elements from the content addressable storage system; and an access log module configured to record access data for each data element stored in the content addressable storage system and to associate the access data for each data element with a content identifier of that data element.

15. The system of claim 14, wherein the access log module receives the content identifier for each data element stored in the content addressable storage system from the content addressable storage system.

16. The system of claim 14, wherein the content identifier of a data element is derived from the content of the data element using a hash algorithm.

17. The system of claim 14, wherein the access data for a data element includes an identifier of an action taken with regard to the data element.

18. The system of claim 14, wherein the access log module is further configured to generate an access report that includes access data for one or more data elements stored in the content storage.

* * * * *